United States Patent [19]

Nerstad et al.

[11] 4,004,670
[45] Jan. 25, 1977

[54] SELF-MODULATED CLUTCH WITH DRAG-REDUCTION VALVE

[75] Inventors: Karl A. Nerstad, Peoria; Franklin O. Koch, Jr.; Curtis E. Chadwick, III, both of Edelstein, all of Ill.

[73] Assignee: Caterpillar Tractor Co., Peoria, Ill.

[22] Filed: July 9, 1975

[21] Appl. No.: 594,475

[52] U.S. Cl. .................. 192/105 A; 192/113 B
[51] Int. Cl.$^2$ .................. F16D 37/00; F16D 13/72
[58] Field of Search .......... 192/85 F, 105 A, 106 F, 192/85 AA, 86, 113 B

[56] References Cited

UNITED STATES PATENTS

| | | | |
|---|---|---|---|
| 3,105,582 | 10/1963 | Ziabicki | 192/113 B |
| 3,176,813 | 4/1965 | Lee et al. | 192/113 X |
| 3,744,608 | 7/1973 | Newman | 192/105 A |
| 3,823,802 | 7/1974 | Winzeler et al. | 192/113 B |

FOREIGN PATENTS OR APPLICATIONS

| | | | |
|---|---|---|---|
| 384,836 | 12/1932 | United Kingdom | 192/105 A |

*Primary Examiner*—Benjamin W. Wyche
*Attorney, Agent, or Firm*—Phillips, Moore, Weissenberger, Lempio & Strabala

[57] ABSTRACT

A clutch for coupling an engine to a transmission gearbox engages and disengages automatically in response to engine speed variation. Springs hold the clutch pressure plate retracted from the clutch discs at idling speeds. As engine speed increases, centrifugally generated fluid pressure in the clutch lubricant overcomes the spring force and applies a modulated engagement pressure to the discs. An internal valve continuously supplies an oil flow to lubricate and cool the clutch components and to charge the centrifugal pressure-generating means. Retraction of the pressure plate shifts the valve to reduce the oil flow while the clutch is disengaged. This reduces viscous drag within the clutch and thereby assures a more controlled disengagement. Retainer means stores some of the reduced oil flow to assure that ample fluid is available to the centrifugal pressure-generating mechanism when engagement commences.

6 Claims, 3 Drawing Figures

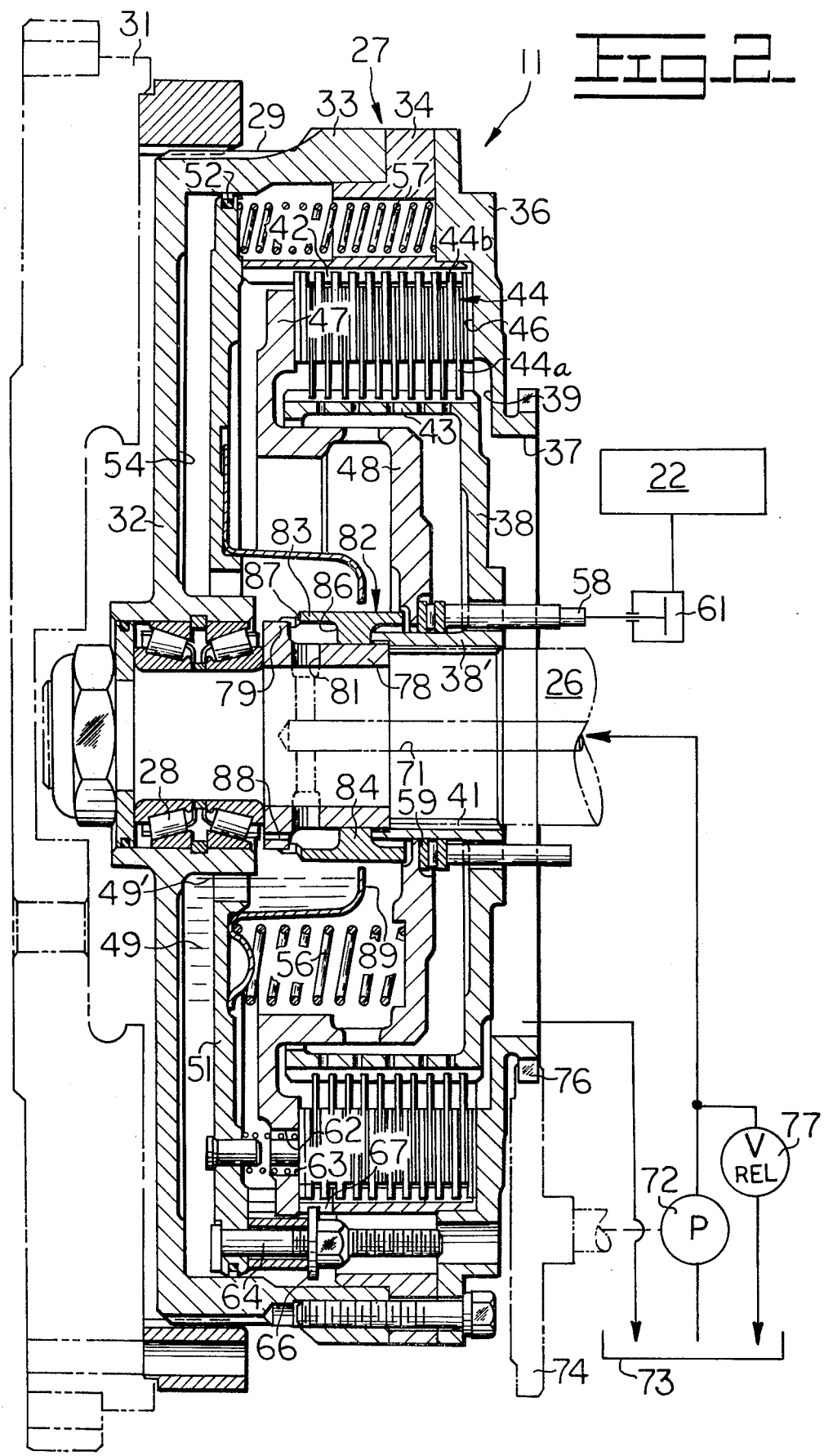

SELF-MODULATED CLUTCH WITH DRAG-REDUCTION VALVE

BACKGROUND OF THE INVENTION

This invention relates to clutch mechanisms for transmitting drive from a vehicle engine to a transmission gearbox, and more particularly to self-modulated clutches which automatically engage and disengage in response to engine speed changes.

Prior U.S. Pat. No. 3,508,450 discloses an advantageous vehicle transmission system having a change speed gearbox of the so-called "manual" type, but in which the operator need not manipulate a clutch pedal or the like in order to accomplish a shift. Movement of the operator's shift lever activates a pneumatic control system which then automatically disengages input and output clutches at opposite ends of the gearbox, brakes the gears to a stationary condition, performs the necessary changes of gear engagements, and then re-engages the input and output clutches to re-establish drive through the system.

In the absence of a clutch pedal or the like, the operator has no means for deliberately disconnecting the engine from the vehicle wheels while temporarily halted at road intersections or for other reasons. Similarly, the operator has no means for manually regulating or modulating the rate of clutch engagement at start-up of the vehicle or in order to reduce shifting shocks. Instead, the system performs both of these functions automatically as the input clutch is provided with a self-modulating mechanism. In particular, springs are present to retract the pressure plate of the input clutch from the clutch discs when engine speed drops to the idling range. This automatically disengages the input clutch when an operator removes his foot from the accelerator pedal of the vehicle or takes equivalent action through some other form of throttle or speed governor control. When the operator subsequently reaccelerates the engine, a rising fluid pressure is generated by centrifugal effects in a volume of lubricant within the clutch. The rising fluid pressure overcomes the disengagement springs and exerts a gradually increasing force on the pressure plate to re-engage the clutch in a modulated manner.

Prior U.S. Pat. Nos. 3,667,583, 3,667,309 and 3,744,608 disclose improved forms of the clutch described above, while prior U.S. Pat. No. 3,570,636 and copending application Ser. No. 452,116 of Phillip S. Webber et al, filed Mar. 18, 1974 now U.S. Pat. No. 28,710 and entitled CONTROL SYSTEM FOR SHIFTING A DRIVE TRANSMISSION, describe pneumatic controls for this type of transmission system including components which automatically force temporary disengagement of the input clutch in the course of a gearshift without regard to engine speed.

Transmission input clutches, including self-modulated clutches, may under certain conditions exhibit an undesirable drag effect while in the disengaged condition. The disengagement tends to be less than complete as some torque continues to be transmitted through the clutch when the pressure plate is retracted from the clutch discs due to frictional or viscous lubricant coupling of adjacent clutch discs. This effect is particularly troublesome in a vehicle equipped with a transmission system of the kind described above in which self-disengagement of the clutch at engine idling speed is relied upon to prevent powered movement of the vehicle when it is temporarily stopped with the engine running. Excessive drag at that time may cause the vehicle to creep and may force the operator to apply the vehicle brake in order to remain stationary. The problem tends to be most severe at start-up in cold weather as the lubricant is relatively viscous at such times.

In the case of manually operated or non-self-modulating clutches, it is known that drag may be reduced by stopping or reducing lubricant flow into the clutch during disengagement as exemplified by prior U.S. Pat. Nos. 3,773,157 or 3,823,802 for example. However, counteraction of drag in self-modulated input clutches of the kind discussed above is complicated as such clutches require a flow of oil not only to lubricate and cool clutch components but also to maintain the self-modulating mechanism charged with fluid. Heretofore, the oil flow into input clutches of this particular kind has either been constant at all stages of clutch operation or, in the case of U.S. Pat. No. 3,570,636 in particular, the oil flow into the clutch has been deliberately increased when the clutch is disengaged to provide increased cooling of the clutch discs during the subsequent engagement which normally occurs at the conclusion of a gearshift. Prior U.S. Pat. No. 3,570,636 includes a proportioning valve which normally distributes 80% of the available oil flow to the gearbox and 20% to the input clutch but temporarily reverses this distribution during the shift.

Counteraction of excessive drag in this kind of transmission system is further complicated by the fact that a controlled limited degree of drag may be deliberately provided for at least at certain specific stages of operation, as described at length in prior U.S. Pat. No. 3,744,608. Since the gears of the associated gearbox are shifted in a stationary or near stationary condition and no synchronizers are provided, it is possible that gear tooth abutments may occur as a shift is attempted. To remove such tooth abutments in order to assure gear engagement, springs may be present in the input clutch to apply a light pressure to the clutch discs prior to the time that full engagement pressure is applied at the conclusion of the gearshift. This gently turns the abutted gears, enabling completion of the desired engagement prior to the time that full torque is reapplied to the gearbox at the conclusion of the gearshift. This "roll-over" torque during a shift period should have a controlled, predetermined magnitude in order to be most effective. The occurrence of a variable uncontrolled additional amount of drag at this stage of operation can delay the desired gear engagements and cause spinning, raking and excessive gear wear.

SUMMARY OF THE INVENTION

The present invention substantially reduces unwanted drag in a self-modulated clutch by providing a valve which restricts lubricant flow to the input clutch during the periods when the clutch is disengaged. In a preferred form of the invention, the flow-restricting valve is internally located in the clutch in position to be shifted to the flow-restricting condition by the movement of another clutch member which occurs at disengagement. If desired, oil pressure itself may be utilized to restore the valve to the unshifted or open position upon re-engagement of the clutch.

In one preferred form of the invention, oil may be supplied to a plenum chamber encircling the clutch output shaft through an internal passage in the output shaft and the valve element may be an annular member which is slidable on the shaft in response to retractive movement of the pressure plate to a position at which the valve element partially or wholly closes the chamber. This particular construction minimizes complication of the input clutch assembly while providing for efficient dispersal of lubricant when the valving member is in the open position.

In most cases the flow-restricting is arranged valve is continue a relatively small flow of oil to the input clutch during periods of disengagement. This maintains the self-modulating mechanism fully charged with fluid so that it may initiate re-engagement when engine speed rises, or at the conclusion of gearshift. In the preferred form of the invention, the reduced oil flow during disengagement is directed into a retainer element communicated with the self-modulating mechanism. This assures that an ample supply of fluid is available for operation of the self-modulating means at the conclusion of the period of disengagement.

Accordingly, it is an object of this invention to reduce unwanted drag in a self-modulated clutch for coupling an engine to a transmission gearbox.

It is another object of the invention to assure a prompt gear engagement and to minimize tooth wear at the conclusion of a shift in a transmission of the form in which the gears are momentarily braked to a stop in order to facilitate shifting.

It is still another object of the invention to assure efficient operation of an oil pressure-actuated, self-modulating mechanism of a transmission input clutch in which oil flow is reduced during periods of clutch disengagement.

The invention, together with further objects and advantages thereof, will best be understood by reference to the following description of a preferred embodiment, taken in conjunction with the accompanying drawings.

BRIEF DESCRIPTION OF THE DRAWINGS

In the accompanying drawings:

FIG. 2 is an axial section view of the input clutch of the transmission system of FIG. 1.

DESCRIPTION OF A PREFERRED EMBODIMENT

Figure 1:
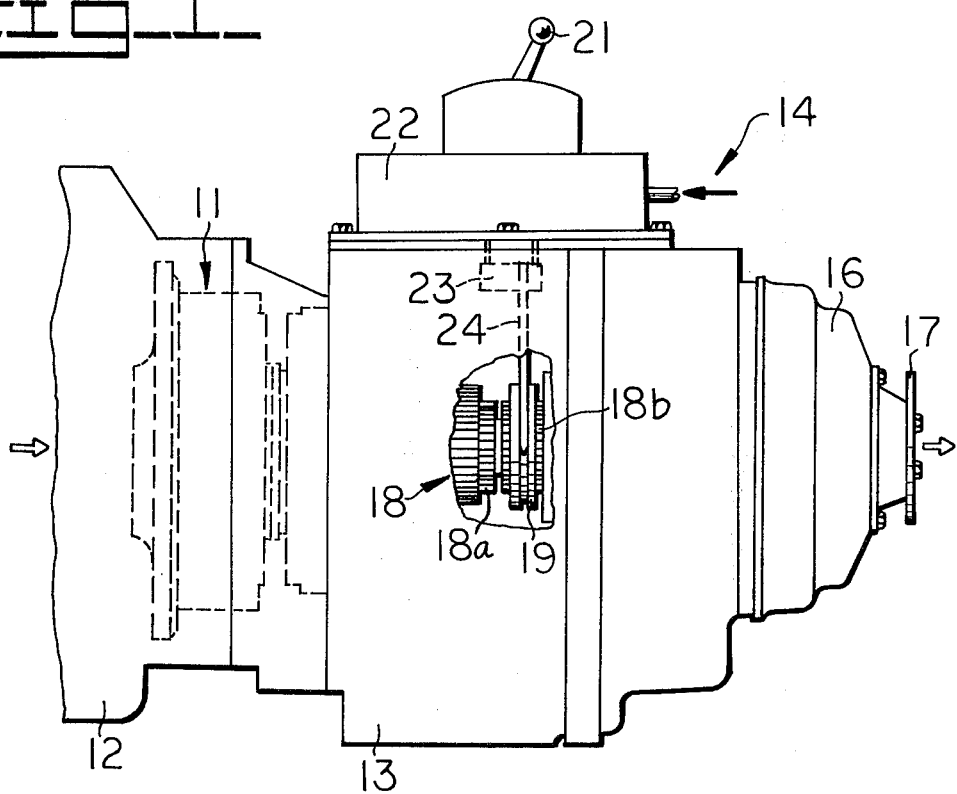
FIG. 1 is a side-elevation view of a vehicle transmission system to which the invention is applicable.

Referring initially to FIG. 1 of the drawings, a self-modulating clutch 11 serves to transmit drive from a vehicle engine 12 to the change speed gearbox 13 of a transmission 14. The transmission 14 may, for example, be of the form disclosed in prior U.S. Pat. No. 3,508,450 and accordingly will be herein described only to the extent necessary to understand the coaction of the present invention therewith.

In addition to the input clutch 11 and gearbox 13, the transmission system also has an output clutch 16 with an output flange 17 for connection to the drive shaft of a vehicle or the like. The gearbox 13 includes a plurality of ratio gears 18, of which only two are shown in FIG. 1, which may be selectively interconnected in different combinations to establish any selected one of a plurality of drive ratios through the gearbox. The gearbox also includes clutch collars 19 which may be shifted axially to engage or disengage adjacent pairs of gear coupling teeth 18a and 18b. Movement of the clutch collars 19 as necessary in response to manual movement of an operator's control lever 21 between speed settings is preferably accomplished by means of a pneumatic control circuit 22 which may be of the form described in detail in U.S. Pat. No. 3,570,636. Upon movement of the gearshift lever 21, circuit 22 disengages the input and output clutches, brakes gears 18, energizes pneumatic actuators 23 to manipulate shift forks 24 as required for the selected speed setting and then re-engages the clutches.

The primary purpose of the input clutch 11 and the output clutch 16 in connection with a change of speed ratios is to decouple the ratio gears 18 from both the driving engine 12 and the driven load so that the gears may be momentarily braked. This enables the clutch collars 19 to be shifted by the actuators 23 without requiring the presence of synchronizers in the gearbox. The input clutch 11 also lightly rotates the ratio gears during the shift period to assure that any tooth abutments between a clutch collar 19 and gear 18 are removed so that desired engagements are completed. To complete the shift, both the input clutch 11 and output clutch 16 are re-engaged with a self-modulating action to effect a smooth, substantially shock-free shift.

Referring now to FIG. 2, the output element of clutch 11 is a rotatable shaft 26 which may be a forward extension of the main shaft of the previously discussed gearbox. An annular input member 27 of the clutch is journaled for rotation on shaft 26 by suitable bearings 28 and carries splines 29 which enable input member to be engaged and driven, by an engine flywheel 31, for example. Input member 27 has a circular forward wall portion 32 and an annular sleeve portion 33 which extends from the rim of the forward wall toward the output end of the clutch. Sleeve portion 33 connects with an annular intermediate portion 34 which in turn connects with an annular back plate 36 that extends radially inward toward shaft 26 and which has a central opening 37 of substantially greater diameter than the shaft.

An annular driven hub 38 is situated within the cavity 39 defined by portions 32, 33, 34 and 36 of the input member, and is coupled to the shaft 26 by splines 41. Intermediate portion 34 of the input member has an annular inner element 42 spaced radially outwardly from an annular inner element 43 of the driven hub 38 and a plurality of flat coaxial annular clutch discs 44 are situated in the space between elements 42 and 43. Alternate ones 44a of the clutch discs are spline-coupled to element 43 of the driven hub for rotation therewith while the intervening ones 44b of the clutch discs are spline-coupled to element 42 for rotation with the input member 27. One end of the series of clutch discs 44 abuts a seat 46 formed on input member back plate 36. An annular pressure plate 47 is situated adjacent the other end of the series of clutch discs 44 and is a part of another annular hub 48 which extends radially inward to an inner sleeve portion 38' of driven hub 38. Hub 48 including the pressure plate is axially slidable along the driven hub portion 38'.

Accordingly, the input clutch 11 may be engaged by forcing pressure plate 47 against the clutch discs 44 to produce a frictional engagement therebetween. Under that condition, rotary motion of input member 27 is transferred to driven hub 38 which in turn transfers the motion to output shaft 26. If pressure plate 47 is retracted away from the clutch discs 44, discs 44b may rotate independently of discs 44a and the clutch is in the disengaged condition. Control of the clutch 11 is thus a matter of controlling the axial position of pressure plate 47.

Pressure for engaging the clutch 11 is generated by centrifugal effects in a volume of oil 49 entrapped between the forward wall portion 32 of the input member and an axially movable capacity-modifying member 51. Movable member 51 may be an annular disc disposed coaxially within the sleeve portion 33 of the input member and which carries a seal 52 engaging the inner surface of sleeve portion 33. Upon rotation of the input member 27, oil or other lubricant is trapped within the chamber 54 by centrifugal force and then exerts a fluid pressure tending to move member 51 toward the pressure plate 47, the degree of such pressure being dependent on the rotational speed of input member 27. To transmit this force from member 51 to the pressure plate 47, a plurality of engagement springs 56 extend between member 51 and portion 48 of the pressure plate. Movement of member 51 in response to increasing fluid pressure in chamber 54 causes springs 56 to exert an increasing force on pressure plate 47. Plate 47 then exerts an increasing force on discs 44 to engage the clutch.

The engagement of the input clutch of a transmission system should not be abrupt. The force which the pressure plate 47 exerts on the clutch discs 44 should increase gradually in order to avoid stalling of the driving engine, to reduce shocks and to reduce wear and the risk of breakage of components. The rate at which the pressure plate force should increase and the maximum level of such force is a function of engine speed, and thus varies under different operating conditions. The necessary clutch modulation functions, which are particularly important when starting up the vehicle after a stop and which are conventionally provided manually through an operator's skilled manipulation of a clutch pedal or the like, are in the present system accomplished automatically by the above-described self-modulating means. The rate at which capacity-modifying member 51 moves to increase the engagement force and the final level of the force are determined by engine speed since the force is derived from centrifugal effects which are dependent on rotational speed.

While the rate of rise of engagement pressure is variable under different conditions as discussed above, there is a maximum force which pressure plate 47 would exert on the clutch discs regardless of speed. Above a certain speed, the clutch capacity should cease being a function of speed and become constant. This is provided for by proportioning the previously described inner element 42 of input member portion 34 to stop further movement of member 51, in response to increasing fluid pressure in chamber 54, at the point where engagement springs 56 are applying the maximum engagement force to pressure plate 47.

Capacity-modifying member 51 is moved away from pressure plate 47 to decrease clutch engagement pressure when engine speed decreases by a plurality of disengagement springs 57 which extend between portion 36 of the input member and member 51. Thus, springs 57 oppose the pressure of oil volume 49 on member 51 and the position of member 51 at any given time is determined by the relative magnitudes of these opposing forces. When the fluid pressure in oil volume 49 is low or absent because engine speed is low or absent, springs 57 are able to force member 51 sufficiently to the left, as viewed in FIG. 2, to relieve all engagement force on the clutch discs 44. As engine speed rises, the rising fluid pressure is increasingly able to overcome the force of springs 57, and gradually moves member 51 toward pressure plate 47 to produce a modulated engagement of the clutch 11.

To assure that pressure plate 47 is completely retracted away from the clutch discs 44 when the input clutch 11 self-disengages in response to lowered engine speed as described above, a series of bolts 64 extend from movable member 51 adjacent the clutch disc assembly. Each bolt 64, which moves with member 51, carries a washer 66 which extends into a slot 67 in the adjacent area of input member portion 34. Washers 66 are positioned to contact pressure plate 47 and to pull it away from clutch discs 44 when member 51 moves to disengage the clutch as described above. When member 51 subsequently moves to engage the clutch, washers 66 move away from the pressure plate 47 to allow the engagement to proceed.

The above-described structure causes the input clutch 11 to automatically disengage when engine speed drops to the idling range and further results in an automatic self-modulated re-engagement of the clutch as engine speed rises above that level. In addition to this mode of operation, disengagement of the clutch 11 must be forced, without regard to engine speed, during the periods at which a shift of gears is underway in the associated gearbox. For this purpose a plurality of pins 58 extend through portion 38 of the driven hub in parallel relationship with shaft 26. An axially slidable needle bearing 59 is situated between the ends of the pins 58 and hub portion 48 of the pressure plate 47. Pins 58 may be moved axially to forcibly retract pressure plate 47 from clutch discs 44 without regard to the above-described engagement force which may be applied to the pressure plate through springs 56. Upon retraction of the pins 58 at the conclusion of the shift period, the input clutch undergoes re-engagement. In the preferred form of the invention, the pins 58 are advanced at the beginning of a shift and released in a controlled manner at the conclusion of the shift by a fluid pressure-actuator 61 controlled by the pneumatic control circuit 22.

It may be desirable that the input clutch 11 transmit a light roll-over torque while the clutch is disengaged, to assure that desired gear engagements are realized in the associated gearbox prior to the time that full re-engagement of the clutch commences at the concluding stage of a shift cylce. For this purpose the pressure plate 47 may have a series of passages 62 receiving roll-over springs 63 which extend between the movable member 51 and the most adjacent one of the clutch discs 44. The roll-over springs 63 remain in contact with the clutch discs 44 while the clutch is disengaged and apply a very slight controlled engagement pressure during disengagement. The light pressure of roll-over springs 63 causes a limited degree of torque transmission which lightly turns shaft 26 and the gears which are coupled thereto within the associated gearbox prior to completion of a shift. This acts to remove any tooth abutments which might be preventing a desired gear engagement from proceeding to completion.

In order to lubricate and cool the moving elements of clutch 11 and to maintain the necessary charge of oil 49 within chamber 54, a continuous flow of oil or other fluid lubricant is supplied to an axial passage 71 within main shaft 26. The oil may be supplied by a pump 72 drawing from a tank 73 which in practice may be the oil pan or bottom portion of the associated transmission, the pump being driven by means such as a gear 74 which engages teeth 76 on portion 36 of the clutch input member. A relief valve 77 is connected between the output of pump 72 and tank 73 to maintain a predetermined maximum oil pressure in the system.

An annular collar 78 is disposed coaxially on shaft 26 between bearing 28 and portion 38' of the driven hub 38 and has a flange 79 which extends a small distance radially outward at the end of the collar which is adjacent bearing 28. Oil supply passages 81 extend through collar 78 in the radial direction adjacent to flange 79 and continue into the main shaft 26 to communicate with axial passage 71.

Accordingly, passages 71 and 81 act to transmit oil into the interior of the clutch and to disperse such oil to the region adjacent to collar 78. In the absence of further mechanism, the oil flow into the clutch would be continuous and substantially uniform at all stages of operation of the clutch. Owing to the rotation of various ones of the clutch elements, when the clutch is in the engaged condition, including the shaft 26 and collar 78, centrifugal effects cause the oil to be dispersed radially outward from the rotary axis of the clutch. Under most operating conditions a substantial flow of such oil is desirable, including a sizable oil flow around the clutch discs 44, but a sizable oil flow around the clutch discs may be undesirable during periods that the clutch is disengaged and particularly when the clutch self-disengages in response to a drop of engine speed to the idling range. At that time the presence of a sizable volume of oil around the clutch discs 44 can cause an excessive and variable amount of clutch drag. This can have the undesirable effect of requiring a vehicle operator to continually apply a brake while the vehicle is temporarily stopped with the engine running. It may also disrupt the operation of the roll-over springs 63 by causing an unpredictable variation of the torque which is transmitted to the clutch during the final stages of a shift for the purpose of assuring gear engagements.

Figure 3:
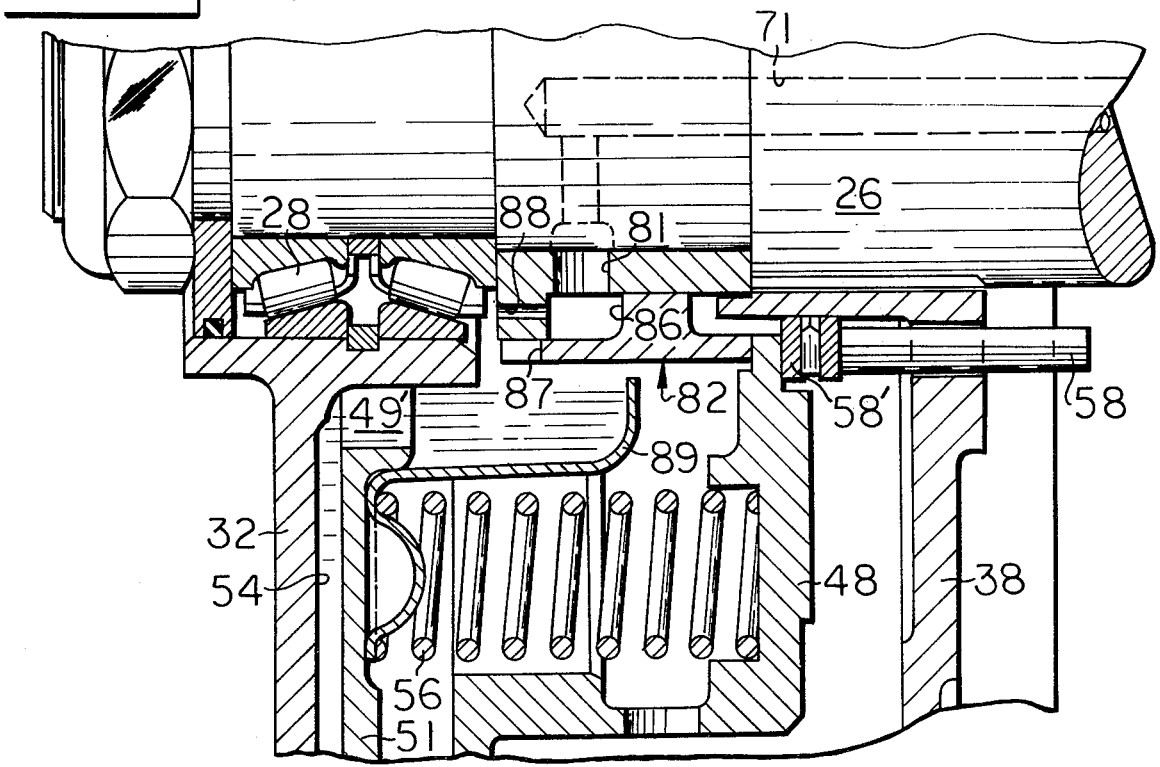
FIG. 3 is another axial section view of a portion of the input clutch structure of FIG. 2 showing the shifted position of certain elements when the clutch is automatically disengaged in response to a decrease of engine speed.

These problems are avoided by a valve member 82 which normally allows the desired maximum oil flow into the clutch from passages 81 but which is shifted when the clutch disengages to restrict such oil flow. The valve member 82 may be an annular element disposed around collar 78 in coaxial relationship therewith. Valve member 82 has a sleeve portion 83 radially spaced from collar 78 by an amount equal to the radial length of flange 79 and has a relatively thick portion 84 which extends radially inward to collar 78. Portion 84 in conjunction with flange 79 forms a plenum chamber 86, communicated with oil supply passages 81, which is maintained full of oil under pressure. Slots 87 in the end of the sleeve portion 83 of the valve member, adjacent flange 79, release oil from chamber 86 radially outwardly when the valve member is moved to an open position at which portion 84 abuts the end of hub portion 38'. At this open position, the valve member 82 is slightly spaced from pressure plate hub 48. Upon retraction of the pressure plate 47 from clutch discs 44 during disengagement, hub 48 contacts valve member 82 and then moves it toward flange 79 to block the release of oil from chamber 86 through slots 87 as shown in FIG. 3.

Thus, when the clutch is disengaged either through the automatic speed-responsive mechanism described above or because of forcible advancement of pins 58 during a gearshift, the flow of oil into the interior of the clutch through slots 87 is cut off and clutch drag during the disengaged state is substantially reduced or eliminated.

The valve member 82 is returned to the open position, as pressure plate 47 shifts back towards the clutch discs 44 to re-engage the clutch, by the force of the oil pressure within chamber 86, although it will be apparent that springs can be employed to assist this movement in instances where oil pressure is insufficient for such purpose.

In many cases it is desirable that some reduced oil flow into the clutch 11 be continued during the disengagement period. Certain elements of the clutch continue to rotate at that time and it is also necessary that the chamber 54 remain charged with oil in order to remain capable of generating the fluid pressures necessary to re-engage the clutch at the conclusion of the disengagement periods. For this purpose one or more restricted flow passages 88 extend through flange 79 of collar 78 to communicate with plenum chamber 86. This allows a small amount of oil to be released from the plenum chamber through passages 88 regardless of the position of valve member 82. Typically, the passages 88 may be proportioned so that the oil flow into the clutch during the disengaged period is about 10 to 15% of that which is present when the member 82 is in the open position. In one example of the invention this reduces clutch drag in the disengaged condition by approximately 80%.

The sizable reduction of oil flow into the clutch during disengagement periods may in some cases require additional means to assure that chamber 54 of the self-modulating means is maintained fully charged during the subsequent engagement cycle. It should be observed that the volume of chamber 54 increases as member 51 moves to apply engagement force to the pressure plate 47. If this movement occurs rapidly because of a rapid increase in engine speed at the start of engagement, the restricted passages 88 may not immediately be able to supply sufficient oil to fill the increased volume of chamber 54. This effect may be counteracted, if necessary, by securing an annular retainer element 89 to member 51. Retainer 89 extends outward from member 51 past slots 87 and then radially inward towards valve member 82. Retainer 89 continues to rotate with member 51 while the clutch is engaged and entraps an additional volume 49' of the oil emitted from passages 88 inasmuch as the rotating oil tends to be driven radially outward by centrifugal force. The oil volume 49' is thus held in readiness to flow into the expanding chamber 54 during the engagement cycle of the clutch as necessary to maintain an adequate charge of fluid in chamber 54.

While the invention has been described with respect to a single preferred embodiment, it will be apparent that many modifications are possible and it is not intended to limit the invention except as defined in the following claims.

What is claimed is:

1. A self-modulating clutch for transmitting drive from an engine to a driven load comprising:
   a rotary input member and a rotary output member,
   a plurality of clutch discs including at least one disc coupled to said input member for rotation therewith and including at least one other disc coupled to said output member for rotation therewith, a pressure plate disposed adjacent said discs and being movable to apply clutch-engagement pressure to said discs and being retractable from said discs to disengage said clutch, self-modulating means forming a lubricant fluid-entrapping chamber within said clutch wherein a fluid pressure is developed from centrifugal effects, the magnitude of said fluid pressure being dependent on the rotational speed of said input member, and including a clutch capacity-modifying member exposed to said fluid pressure and movable thereby, at least one disengagement spring acting on said capacity-modifying member in opposition to said fluid pressure thereon.

at least one engagement spring disposed between said capacity-modifying member and said pressure plate to apply increasing engagement pressure to said discs through said pressure plate when said capacity-modifying member moves in response to increasing fluid pressure in said chamber, passage means for supplying a flow of lubricant fluid to said clutch, valve means for reducing said lubricant flow when said clutch is disengaged, wherein said valve means continues to admit a reduced flow of said lubricant into said clutch while said clutch is disengaged, and a fluid-retainer communicated with said chamber of said self-modulating means and positioned to receive said restricted flow of lubricant fluid whereby a reserve of said lubricating fluid is available to said self-modulating means upon expansion of said chamber thereof in the course of re-engagement of said clutch.

2. A self-modulating clutch for transmitting drive from an engine to a driven load comprising:

a rotary input member and a rotary output member, wherein said rotary input member is an annular element and said rotary output member is a rotatable shaft extending within said input member in coaxial relationship therewith and having a lubricant supply passage which extends axially within said shaft and then radially outwardly therein to release lubricant, a plurality of clutch discs including at least one disc coupled to said input member for rotation therewith and including at least one other disc coupled to said output member for rotation therewith, a pressure plate disposed adjacent said discs and being movable to apply clutch-engagement pressure to said discs and being retractable from said discs to disengage said clutch, self-modulating means forming a lubricant fluid-entrapping chamber within said clutch wherein a fluid pressure is developed from centrifugal effects, the magnitude of said fluid pressure being dependent on the rotational speed of said input member, and including a clutch capacity-modifying member exposed to said fluid pressure and movable thereby, at least one disengagement spring acting on said capacity-modifying member in opposition to said fluid pressure thereon, at least one engagement spring disposed between said capacity-modifying member and said pressure plate to apply increasing engagement pressure to said discs through said pressure plate when said capacity-modifying member moves in response to increasing fluid pressure in said chamber, passage means for supplying a flow of lubricant fluid to said clutch, and valve means for reducing said lubricant flow when said clutch is disengaged, wherein said valve means is an annular sleeve disposed on said shaft and being slidable therealong to reduce the release of lubricant from said supply passage.

3. The combination defined in claim 2 further comprising means forming a flange on said shaft adjacent said radial portion of said passage thereof, and wherein said valve means has a sleeve portion of greater diameter than said shaft and another portion extending radially inward from said sleeve portion to form a plenum chamber in conjunction with said flange for receiving lubricant emitted from said radial portion of said passage, said sleeve portion of said valve means having at least one lubricant release opening which is closed by axial movement of said valve means on said shaft when said clutch is disengaged.

4. The combination defined in claim 2 further comprising means forming a restricted flow passage for continuing to release a reduced flow of lubricant from said plenum chamber into said clutch when said lubricant release opening is closed by said axial movement of said valve means.

5. The combination defined in claim 4 further comprising a bearing journaling said input member to said shaft and situated adjacent said flange, and wherein said restricted flow passage extends through said flange to direct said reduced flow of lubricant initially towards said bearing.

6. The combination defined in claim 4 further comprising an annular retainer secured to said capacity-modifying member and communicating with said chamber of said self-modulating means, said retainer having a reserve lubricant entrapping portion extending in coaxial relationship with at least an adjacent portion of said valve means sleeve to receive fluid released through said restricted passage during the disengaged condition of said clutch.

* * * * *